No. 670,345. Patented Mar. 19, 1901.
J. W. KIRKMAN.
HAND SIFTER.
(Application filed Nov. 20, 1900.)
(No Model.)
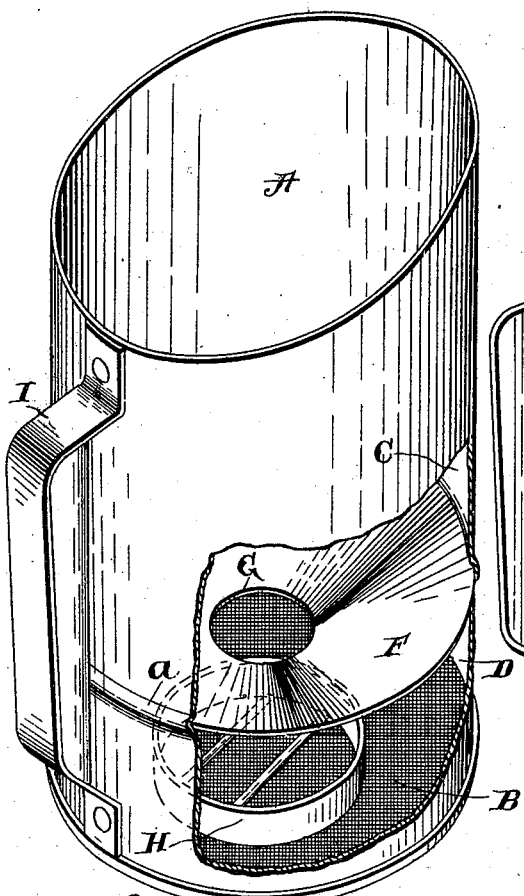
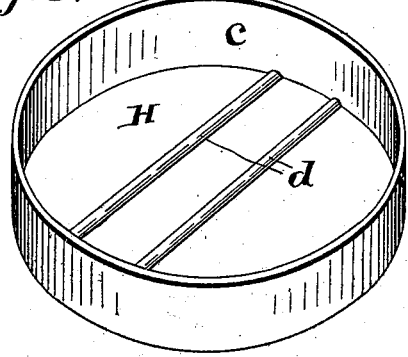
Witnesses
Geo. E. Frech.
Chas. R. Wright Jr.
Inventor
James W. Kirkman,
A. S. Pattison Attorney
THE NORRIS PETERS CO., PHOTO-LITHO., WASHINGTON, D. C.

UNITED STATES PATENT OFFICE.

JAMES W. KIRKMAN, OF BALTIMORE, MARYLAND.

HAND-SIFTER.

SPECIFICATION forming part of Letters Patent No. 670,345, dated March 19, 1901.

Application filed November 20, 1900. Serial No. 37,169. (No model.)

*To all whom it may concern:*

Be it known that I, JAMES W. KIRKMAN, a citizen of the United States, residing at Baltimore, in the State of Maryland, have invented new and useful Improvements in Hand-Sifters, of which the following is a specification.

My invention relates to improvements in flour-sifters, and pertains to a sifter which is constructed and adapted to be used with one hand, all of which will be hereinafter fully described.

In the accompanying drawings, Figure 1 is a perspective view of the sifter embodying my invention, the same being shown partly in section for the purpose of disclosing the interior construction. Fig. 2 is a vertical sectional view of the same. Fig. 3 is a detached perspective view of the movable sifting member.

Referring now to the drawings, A indicates a vessel, which is preferably though not necessarily of the combined cup-and-scoop formation herein shown. The bottom of this vessel A is provided with a sifting material B, such as wire and of the character that is usually used for sifting purposes. This vessel is divided into two separate compartments—an upper compartment C and a lower compartment D—through the medium of a partition or separating-plate F. This separating-plate F, which divides the vessel into the two aforesaid compartments, is preferably removable from the vessel for a purpose which will be hereinafter explained. The said partition is supported within the vessel in any suitable manner; but, as shown, I prefer to have it supported within the vessel through the medium of an interior outwardly-projecting groove *a*, into which the said partition or separating-plate projects. The said partition or separating-plate can be readily thrown into and out of the said groove for the purpose of inserting it into position and removing it therefrom. It will be noticed that this separating-plate is provided, as here shown, with a central aperture G and that the upper face of the said separator is preferably concave, as here shown.

Located within the lower compartment D and below the separating-plate is a movable and free agitator H. This agitator H may be of any desired construction which will glide along over the upper face of the sifting material or wire located in and forming the bottom of the lower compartment D, though, as here shown, the preferred form consists of a vertically-arranged band *c*, with one or more transverse bars *d* extending across its bottom and practically in a plane therewith.

In the operation of this invention the flour is placed in the upper compartment, in any desired way, in a vessel of the character here formed. It will be placed therein by a scooping action. The separating-plate then serves to support the bulk of the flour or other material being sifted in the upper compartment. By a lateral movement of the vessel, through the medium of its handle I, the free and movable agitator H will be caused to move across the upper face of the wire sifting material and by this movement to cause the flour or other material to be quickly and readily sifted. Innumerable movements can be given to the free and movable agitator. For instance, by a circular movement of the vessel the agitator will be made to travel around in a circular direction in the lower compartment. By a reciprocating movement of the vessel the agitator can be made to move in any desired direction according to the direction of reciprocation given the vessel.

The division-plate here shown is for the purpose, as aforesaid, of supporting the bulk of the material to be sifted in the upper compartment of the vessel, and while I here show this plate of the preferred construction it will be readily understood that that may be varied. The object to be obtained by this division-plate is to permit a portion of the material by the movement of the vessel to pass into the lower compartment, and the same movement of the vessel which causes the material to pass from the upper into the lower compartment at the same time transmits a motion to the agitator which causes a sifting of the material falling from the upper compartment into the lower compartment. Therefore any form or construction of division-plate or separator which will permit a portion of the material in the upper compartment to pass through into the lower compartment while the bulk of the material is maintained in the upper compartment will accomplish my purpose and be within the scope of my invention.

Through the medium of a hand-sifter of this character, which is especially intended for culinary purposes, the user needs but one hand to sift the material from the vessel, while the other hand is free for the purpose of stirring the sifted material in the vessel placed below for its reception.

In a sifter constructed substantially as here shown and described, whereby the operation and function herein stated are obtained, a very cheap and yet effective sifter is provided, having certain advantages over that form of sifter which requires one hand for the purpose of transmitting motion a revolving sifting member and the other to support the vessel containing the material to be sifted. It will also be understood that while the division-plate is preferred, yet if a movable free agitator is made of sufficient weight it can be caused to operate in the manner shown and described without the use of a separating-plate, though, as already explained, a separating-plate is much to be preferred, as improving very materially the operation of my invention.

Having thus described my invention, what I claim, and desire to secure by Letters Patent, is—

1. A hand-sifter comprising a cup-like receptacle having a perforated bottom, a perforated partition situated above the bottom and forming a lower compartment in the said cup, and an agitator placed loosely upon the said bottom and out of contact with the said partition, substantially as described.

2. A hand-sifter comprising a cup-like receptacle having a perforated bottom, a conically-arranged partition within the cup above the said bottom, the said partition having a central opening, and an agitator placed loosely upon the said woven bottom and out of contact with the said partition, substantially as described.

3. A hand-sifter comprising a cup-like receptacle having a perforated bottom, a removable perforated partition located within the said cup above its bottom and forming a lower compartment, the said partition being perforated, and an agitator resting loosely upon the said bottom, substantially as described.

In testimony whereof I have hereunto set my hand in the presence of two subscribing witnesses.

JAMES W. KIRKMAN.

Witnesses:
MURRAY HANSON,
WILLIAM H. BERRY.